United States Patent
Yang et al.

(10) Patent No.: US 7,492,109 B2
(45) Date of Patent: Feb. 17, 2009

(54) APPARATUS FOR CONTROLLING LAMP SOURCE AND ELECTRIC EQUIPMENT AND POWER SOCKET THEROF

(75) Inventors: Kuo-Hsiang Yang, Hsinchu (TW); Ju-Chia Kuo, Taoyuan County (TW); Jenn-Chyi Chung, Changhua (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 11/740,930

(22) Filed: Apr. 27, 2007

(65) Prior Publication Data

US 2008/0157697 A1 Jul. 3, 2008

(30) Foreign Application Priority Data

Dec. 29, 2006 (TW) .............................. 95150012 A (51) Int. Cl.
*H05B 37/00* (2006.01)

(52) U.S. Cl. .................. 315/291; 315/294; 315/295; 315/297

(58) Field of Classification Search .................. 315/291, 315/292, 293, 294, 295, 297, 299, 301, 307
See application file for complete search history.

(56) References Cited

U.S. PATENT DOCUMENTS

2007/0236156 A1* 10/2007 Lys et al. .................... 315/291

* cited by examiner

*Primary Examiner*—David Hung Vu
(74) *Attorney, Agent, or Firm*—Jianq Chyun IP Office (57) ABSTRACT

An apparatus for controlling an electric equipment is provided. The apparatus includes an input unit for generating a digital control signal carried on a power line to be transmitted to a power socket according to an operation of a user. The power socket receives the digital control signal through the power line, and determines whether or not to provide a power source to the electric equipment according to the digital control signal.

6 Claims, 6 Drawing Sheets

APPARATUS FOR CONTROLLING LAMP SOURCE AND ELECTRIC EQUIPMENT AND POWER SOCKET THEROF

CROSS-REFERENCE TO RELATED APPLICATION

This application claims the priority benefit of Taiwan application serial no. 95150012, filed Dec. 29, 2006. All disclosure of the Taiwan application is incorporated herein by reference.

BACKGROUND OF THE INVENTION

1. Field of the Invention

The present invention relates to a technology for controlling an electric equipment. More particularly, the present invention relates to a technology for controlling an electric equipment using power line communication.

2. Description of Related Art

In a conventional lamp control system, a same lamp source can be controlled with a plurality of switches at different positions. For example, in a corridor, the control switches of a same lamp source can be arranged at both ends of the corridor. Thus, a person walking through the corridor can turn on the lamp source with the switch when steps into the corridor, and turn off the lamp source with the switch at the other end, thereby saving the power.

Figure 1:
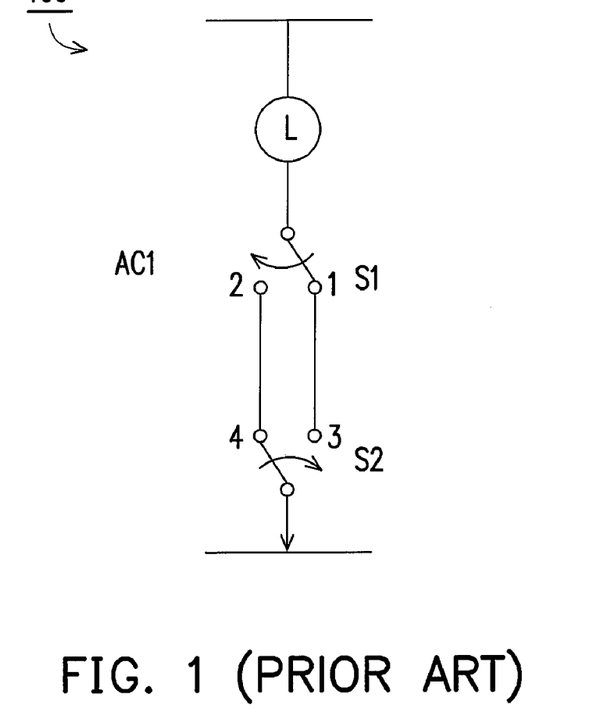
FIG. 1 is a circuit diagram of a conventional lamp control system.

FIG. 1 is a circuit diagram of a conventional lamp control system. Referring to FIG. 1, a plurality of switches, e.g., S1 and S2, are included in the conventional lamp control system 100, for controlling the turn on/off of a lamp source L. The switches S1 and S2 are connected in series. When the switches S1 and S2 assume positions 1 and 4 respectively, or at positions 2 and 3 respectively, the lamp control system 100 is in an open-circuit state, so the lamp source L is turned off.

In an initial state, the switches S1 and S2 assume positions 1 and 4 respectively. When a user switches the switch S1 from position 1 to position 2, or switches the switch S2 from position 4 to position 3, the lamp control system 100 forms a loop with a power source AC1, such that the lamp source L emits light. After the user switches the position of the switch S1 or S2 to turn on the lamp source L, the user can switch the position of any one of the switch S1 or S2 again to turn off the lamp source L.

Figure 2:
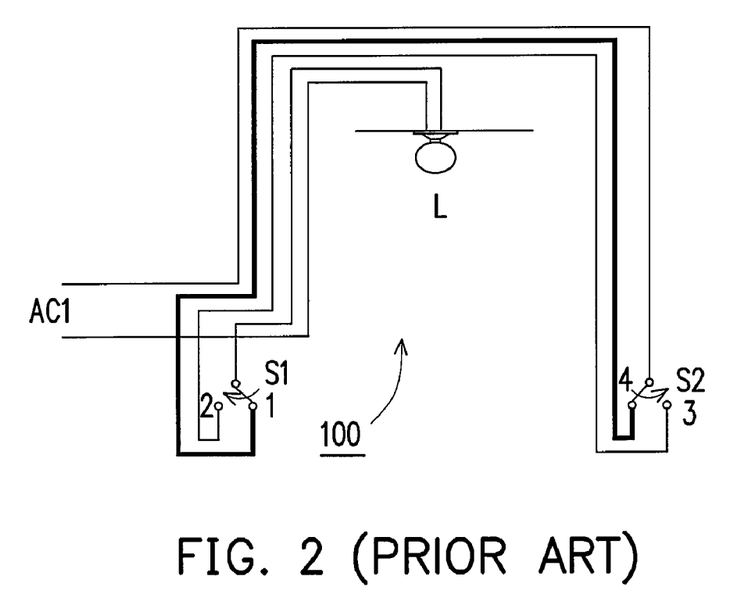
FIG. 2 is an actual schematic wiring diagram of a conventional lamp control system.

Though the circuit diagram of the lamp control system 100 of FIG. 1 is quite simple, in practice, the circuit is very complicated. FIG. 2 is a schematic view of actual wiring of a conventional lamp control system. It is known from FIG. 2 that the wiring of the conventional lamp control system 100 is very complicated. Moreover, when the number of switches increases, the complexity of wiring will increase in multiples. In addition, in the conventional lamp control system 100, after the switches S1 and S2 are configured, new switches cannot be added. In order to add new switches, the wirings of the entire lamp control system 100 must be completely removed, and new pipelines must be arranged to add a set of switches, which is very uneconomical.

SUMMARY OF THE INVENTION

Accordingly, the present invention is directed to a lamp source control apparatus using simple wiring to realize the control of a lamp source.

The present invention is also directed to an apparatus for controlling an electric equipment and a method thereof, so as to control the turn on/off of the electric equipment with flexible arrangement.

The present invention is further directed to a power socket for controlling the turn on/off of an electric equipment.

The present invention provides an apparatus for controlling a lamp source, which includes an input unit for generating a digital control signal carried on a power line to be transmitted to a lamp socket according to an operation of a user. The lamp socket receives the digital control signal through the power line, and determines whether or not to provide a power source to the lamp source according to the digital control signal.

From another point of view, the present invention provides an apparatus for controlling an electric equipment, which includes an input unit for generating a digital control signal carried on a power line to be transmitted to a power socket according to an operation of a user. The power socket receives the digital control signal through the power line, and determines whether or not to provide a power source to the electric equipment according to the digital control signal.

The present invention transmits the digital control signal to the power socket through the power line, so as to control the power socket to provide the power to the electric equipment or not. Therefore, the wiring of the present invention is simple and flexible.

In order to make the aforementioned and other objects, features and advantages of the present invention comprehensible, selected embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

It will be understood that the terms "couple", "connect", and "bind", when used in the specification, are intended to indicate that two components are directly connected or are connected through certain elements such as capacitors, or indicate the transmission of electrical signals between two components.

Figure 3:
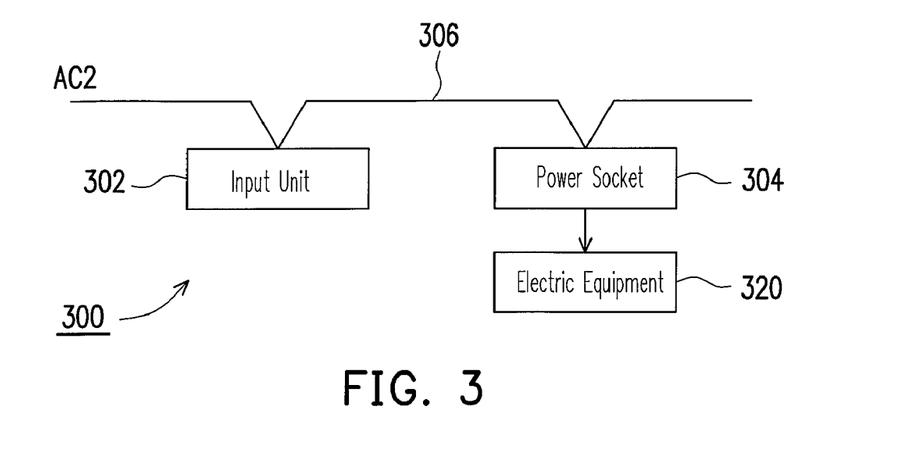
FIG. 3 is a system architectural view of an apparatus for controlling an electric equipment according to an embodiment of the present invention.

FIG. 3 is a system architectural diagram of an apparatus for controlling an electric equipment according to a first embodiment of the present invention. Referring to FIG. 3, the control apparatus 300 of the present invention includes an input unit 302 and a power socket 304, which are bound through a power line 306. The power line 306 is coupled to a power source AC2. In this embodiment, the power source AC2 can be, but is not limited to, an AC power source, in the present invention.

Referring to FIG. 3 again, the input unit 302 can generate a digital control signal according to an input of a user, and carries the digital control signal on the power line 306 to transmit. Thus, the power socket 304 can capture the digital control signal transmitted over the power line 306, and determines whether or not to provide the power source AC2 to the electric equipment 320 according to the digital control signal.

For example, a user if intending to turn on the electric equipment 320, only needs to operate on the input unit 302 to enable the input unit 302 to generate a turn-on digital control signal. When the power socket 304 captures the turn-on digital control signal, the power source AC2 is provided to the electric equipment 320 to enable the electric equipment 320 to operate normally. Similarly, the user, if intending to turned off the electric equipment 320, only needs to operate on the input unit 320 to send a turn-off digital control signal to the power socket 304, and the power socket 304 will stop providing power source AC2 to the electric equipment 320 accordingly, such that the electric equipment 320 stops operating.

Figure 4A:
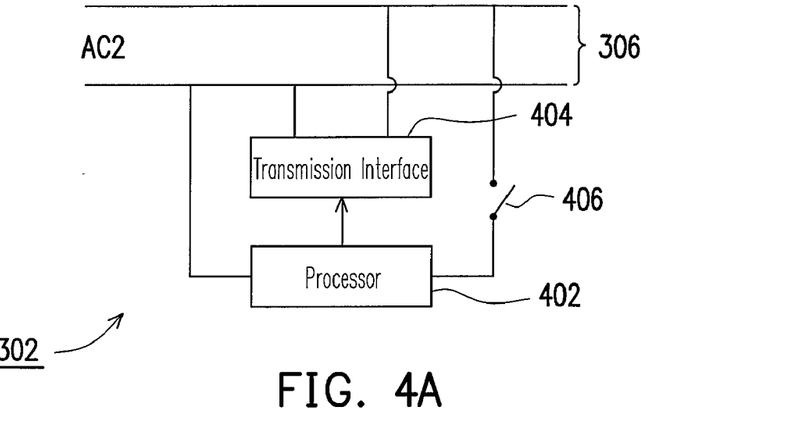
FIG. 4A is a circuit block diagram of an input unit according to an embodiment of the present invention.

FIG. 4A is a circuit block diagram of an input unit according to an embodiment of the present invention. Referring to FIG. 4A, the input unit 302 includes a processor 402, a transmission interface 404, and a switch 406. The processor 402 is coupled to the transmission interface 404, and is coupled to the power line 306 through the switch 406.

When a user turns on the switch 406, the processor 402 can send the turn-on digital control signal to the transmission interface 404. At this time, the transmission interface 404 carries the digital control signal output from the processor 402 on the power line 306 to transmit. Similarly, when the user turns off the switch 406, the processor 402 sends the turn-off digital control signal, which is carried on the power line 306 to transmit through the transmission interface 404.

Figure 4B:
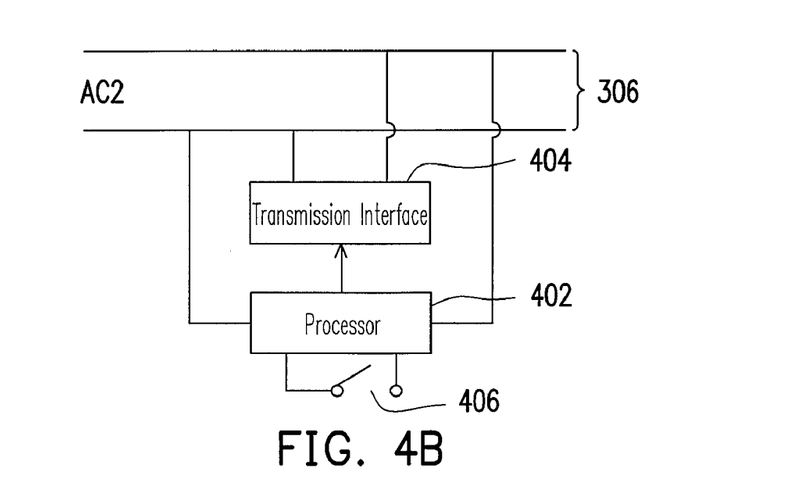
FIG. 4B is a circuit block diagram of an input unit according to another embodiment of the present invention.

Though FIG. 4A shows a structural view of the input unit of the present invention, persons of ordinary skill in the art should know that the present invention is not limited to such a structure. FIG. 4B is a circuit block diagram of an input unit according to another embodiment of the present invention. In FIG. 4B, according to the operation of the user, the switch 406 can determine whether or not to connect a functional pin of the processor 402 to a reference level.

In other optional embodiments of the present invention, the input unit 302 is not limited to be directly coupled to the power line 306, but can be connected to the power line 306 through a power source extension device, such as an extension line or a plug.

Figure 4C:
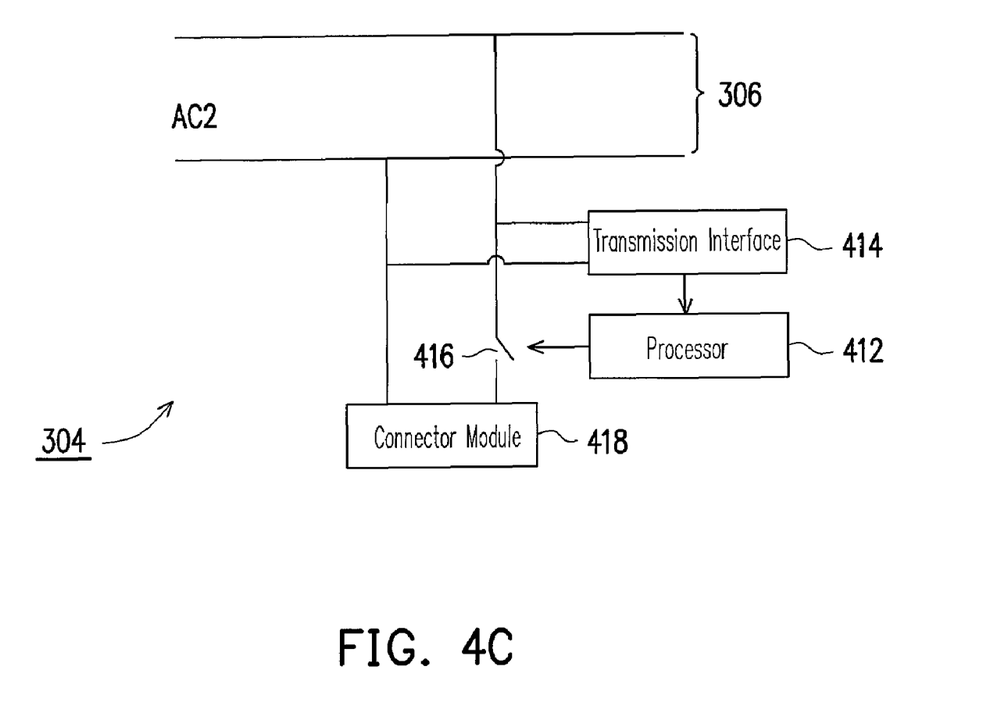
FIG. 4C is a circuit block diagram of a power socket according to an embodiment of the present invention.

FIG. 4C is a circuit block diagram of a power socket according to an embodiment of the present invention. Referring to FIG. 4C, the power socket 304 includes a processor 412, a transmission interface 414, a switch 416, and a connector module 418. The processor 412 is coupled to the power line 306 through the transmission interface 414. In addition, the power line 306 is also coupled to the connector module 418 through the switch 416. In this embodiment, the connector module 418 is used to connect, for example, the electric equipment 320 of FIG. 3. The connector module 418 can be in different forms, for example, a socket compatible with common plugs, electrical wires fixed with screws, or some special connectors, but the present invention is not limited herein.

Referring to FIG. 4C again, the processor 412 can capture the digital control signal form the power line 306 through the transmission interface 414. In this embodiment, the transmission interface 414 can be a filter. Generally speaking, the frequency of AC power is between about 50-60 Hz. Therefore, the transmission interface 414 can filter out the digital control signal carried on the AC2, and transmit the digital control signal to the processor 412. Thus, the processor 412 can determine whether or not to turn on the switch 416 according to the digital control signal captured by the transmission interface 414.

When the digital control signal captured by the transmission interface 414 is a turn-on digital control signal, the processor 412 will turn on the switch 416, and thus, the power socket 304 can supply the power source AC2 through the connector module 418. Comparatively, if the processor 412 receives the turn-off digital control signal, the processor 412 will turn off the switch 416, such that the power socket 304 stops supplying power source AC2.

In other optional embodiments, the power socket 304 can carry an execution result in the form of digital signal on the power line 306 and transmit it back through the transmission interface 414. The input unit 302 can receive this signal from the transmission interface 414, and confirm that the power socket 304 has received the digital control signal, and has completed the turn on or turn off task according to this signal.

Figure 5:
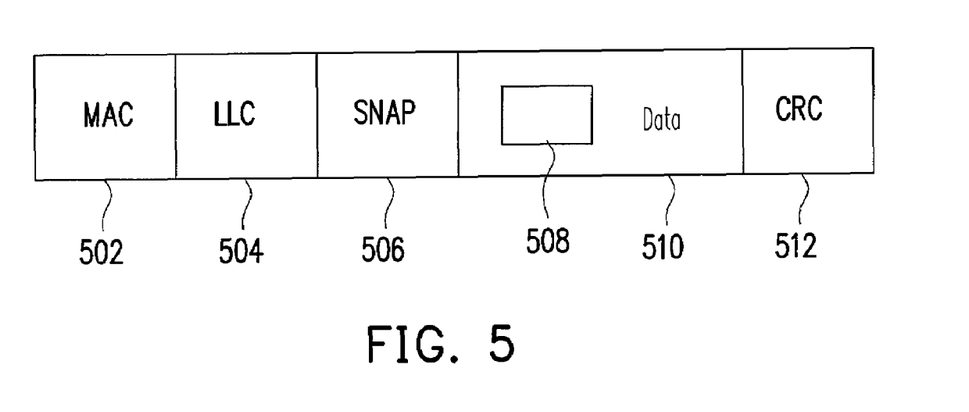
FIG. 5 is a schematic view of a format of the digital control signal according to an embodiment of the present invention.

FIG. 5 is a schematic view of a format of the digital control signal according to an embodiment of the present invention. Referring to FIG. 5, in this embodiment, the format of the digital control signal can be a standard 802.3 format, including a media access control (MAC) field 502, an LLC field 504, a sub-network access protocol (SNAP) field 506, a data field 510, and a bit integrity check (CRC) field 512. The information for controlling the turn on/off of the electric equipment is stored in an area 508 in the data field 510.

Figure 6:
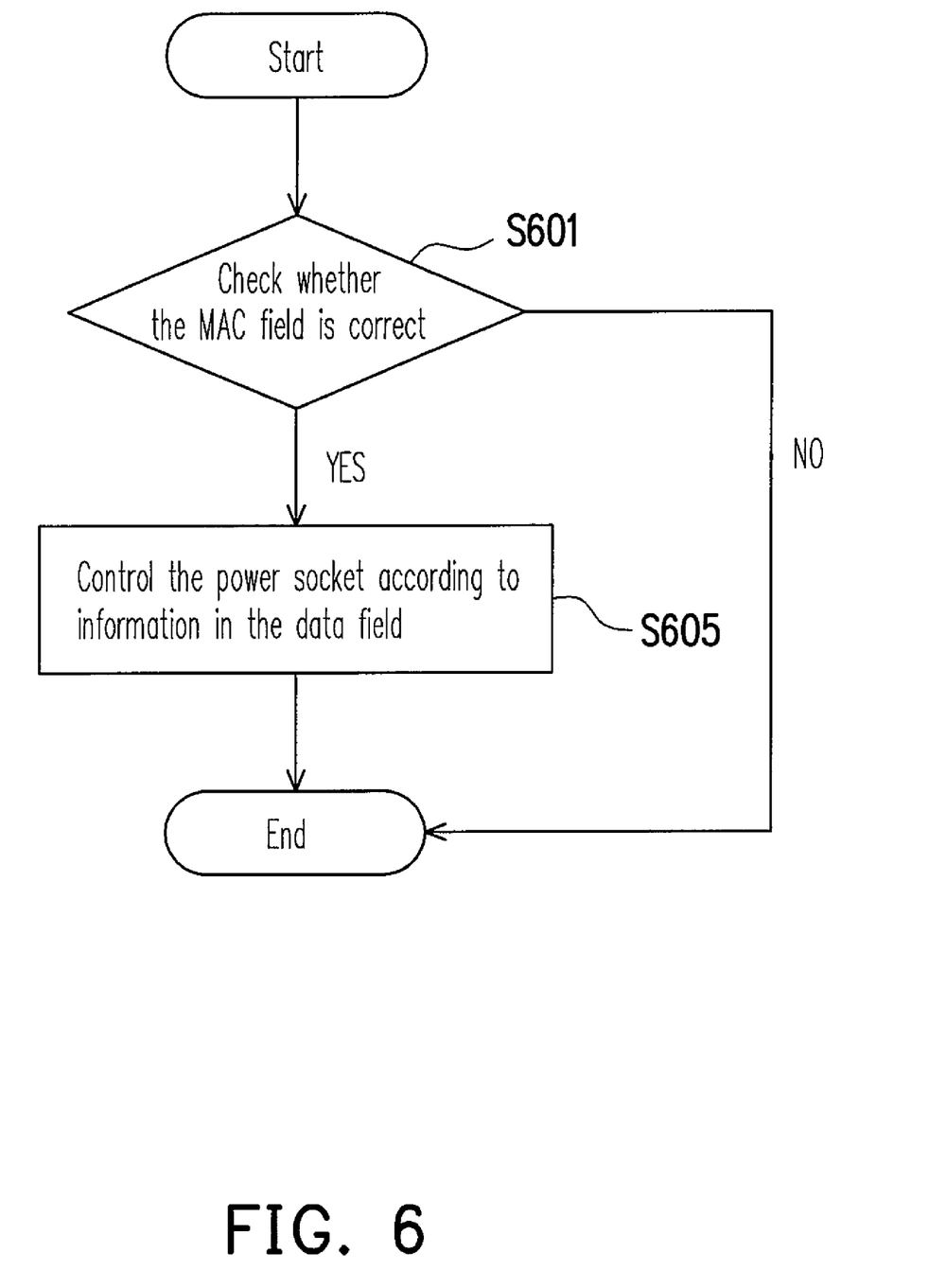
FIG. 6 is a flow chart of the steps that a processing unit processes the control signal according to an embodiment of the present invention.

FIG. 6 is a flow chart of the steps that a processing unit processes the control signal according to an embodiment of the present invention. Referring to FIGS. 4B-6 together, after receiving the digital control signal from the transmission interface 414, as described in Step S601, the processor 412 checks information in the MAC field 502 of the digital control signal. As the information in the MAC field 502 is unique, when a plurality of digital control signals is transmitted on the power line 306, the processor 412 will not receive wrong digital control signals according to the information in the MAC fields 502 of the digital control signals. In addition, the digital control signal provided in this embodiment has a destination MAC and a source MAC for addressing and identifying, so it is applicable to trans-network communication.

When the processor 412 checks the MAC field 502 and determines it to be inconformity (i.e., "NO" marked in step S601), the entire process ends. On the contrary, if the processor 412 checks the MAC field 502 and determines it to be correct (i.e., "YES" marked in Step S601), the processor 412 controls the turn on of the switch 416 according to the information stored in the storage area 508 of the data field 510, so as to decide whether or not to provide the power by the power socket.

The processor 412 can also be preset to process the digital control signals coming from specific source MACs, and ignore the digital control signals coming from other MACs.

In this embodiment, the information stored in the storage area 508 can be a "NOT" instruction. Therefore, after the processor 412 confirms that the digital control signal is correct, the switch 416 is made to operate oppositely according to the "NOT" instruction. For example, if the switch 416 is turned on, it will be turned off, or vice versa.

Moreover, each power socket of the present invention is assigned with an alias, e.g., a "first power socket" or a "second power socket", and these aliases can be recorded in the data field 510. When receiving a digital control signal, the processor 412 can interpret whether the received digital control signal is correct according to the aliases stored in the data field 510.

The communication protocol used in the present invention is not limited, and the 802.3 communication protocol is applied in this embodiment for illustrating the operation mode of controlling the electric equipment.

Though an optional format of the digital control signal is provided in FIG. 5 of the present invention, the present invention is not limited to this. Persons of ordinary skill in the art can develop digital control signals of different formats or can encrypt the digital control signals according to different requirements.

In this embodiment, the communication is carried out on the network architecture having a collision handling function. Certainly, other conventional communication networks, such as a master-slave network or a token network, can also be used.

Figure 7:
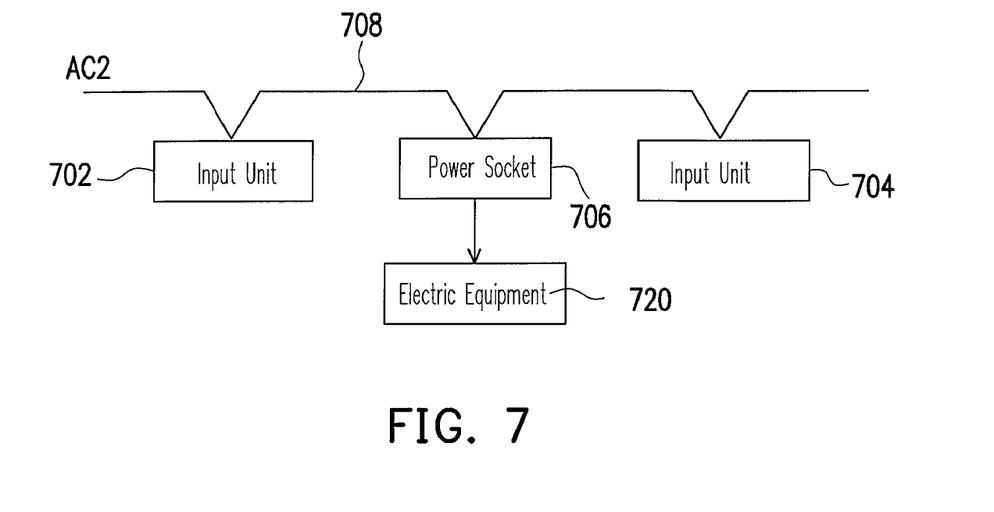
FIG. 7 is a system architectural view of an apparatus for controlling an electric equipment according to a second embodiment of the present invention.

FIG. 7 is a circuit block diagram of an apparatus for controlling an electric equipment according to the second embodiment of the present invention. Referring to FIG. 7, in this embodiment, a plurality of input units can be used to control a single power socket. For example, input units 702 and 704 are used to generate a digital control signals and to carry the digital control signals on the power line to transmit, so as to control the power socket 706 to provide the power source AC2 to the electric equipment 720 or not.

As described above, a "NOT" instruction can be compiled in the data formats of the digital control signals generated by the input units 702 and 704, and transmitted to the power socket 706. Even though the power socket 706 receives the same instruction stored in the data format of the digital control signal from the input unit 702 or 704, the power socket 706 can distinguish that the sources of the digital control signals are different according to the source MACs in the digital control signals. Therefore, the present invention can use a plurality of input units to control a single power socket. In addition, it is known from this embodiment that as the present invention uses the power line to transmit the digital control signal, when new input units for controlling the power socket are required, it is unnecessary to arrange the wires again, and the new input units can operate normally after being connected to the power line 708 in series. Thus, the flexibility in use of the present invention is improved.

Figure 8:
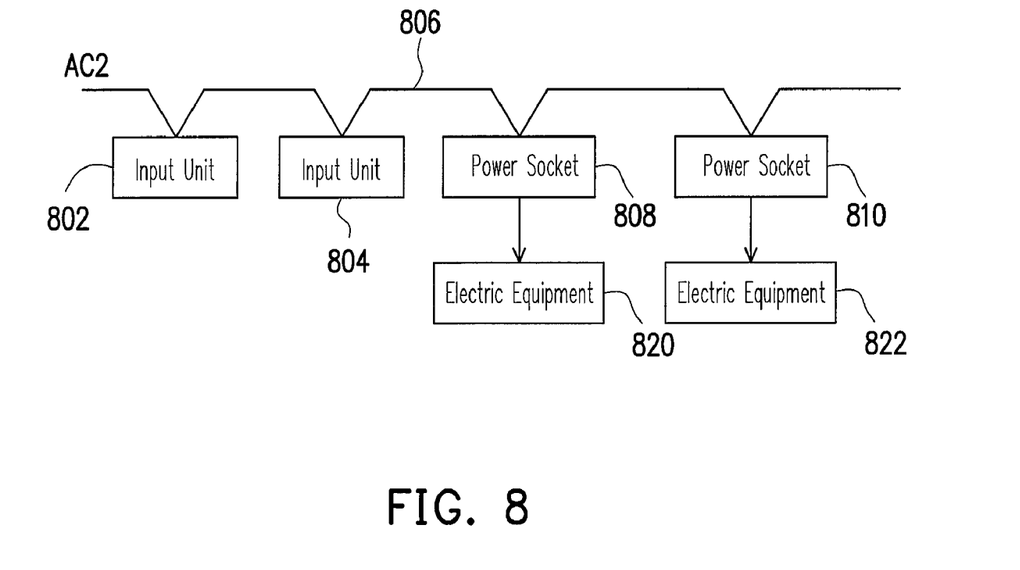
FIG. 8 is a system architectural view of an apparatus for controlling an electric equipment according to a third embodiment of the present invention.

FIG. 8 is a circuit block diagram of an apparatus for controlling an electric equipment according to the third embodiment of the present invention. Referring to FIG. 8, an embodiment that a plurality of input units is used to control a plurality of power sockets is provided. In this embodiment, input units 802 and 804 can generate different digital control signals according to the operation of the user, and carry the digital control signals on the power line 806 to transmit, so as to control the power sockets 808 and 810 to provide the power source AC2 to electric equipments 820 and 822.

As the digital control signals generated by the input units 802 and 804 can have MAC fields as described above, when a plurality of digital control signals are transmitted on the power line 806, different power sockets will not have wrong operations according to irrelevant digital control signals.

Though the control architecture of one-to-one, many-to-one, and many-to-many have been provided above, the present invention is not limited to such architecture. Persons of ordinary skill in the art should understand that the present invention can also support one-to-multiple control.

In addition, the aforementioned electric equipment covers a quite broad range including lamp sources, electric bells, pump motors, and the like. As long as the equipment uses an input unit to control the turn on/off thereof, the equipment falls within the scope of the present invention. Here, the lamp sources are taken as an example to illustrate the application of the present invention.

In an optional embodiment, the processors 402 and 412 can have the functions of communication, timing, longest ON time limitation setting, and maximum current limitation setting and the like. In addition, the processors 402 and 412 can have built-in calendars, so as to determine the time of supplying power to the electric equipment on the basis of sunrise and sunset time calculated according to the latitude and longitude of the electric equipment. For example, the time of supplying power to the lamp sources in the yard is determined according to the calculated sunset time, so as to save the power.

Figure 9A:
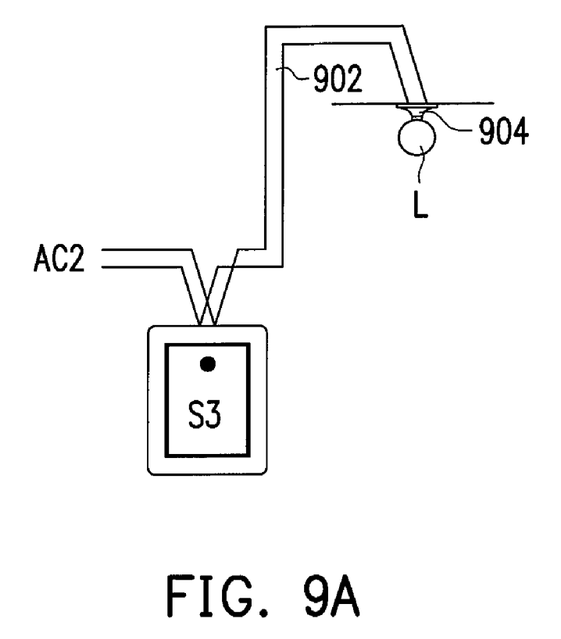
FIG. 9A is an actual wiring diagram of a lamp control apparatus according to an embodiment of the present invention.

FIG. 9A is an actual wiring diagram of a lamp control apparatus according to an embodiment of the present invention. Referring to FIG. 9A, a switch S3 is connected to the power source AC2 and a lamp socket 904 through a power line 902. Thus, the user can operate on the switch S3 to control whether the lamp socket 904 supplies the power source AC2 to a lamp source L or not, so as to turn on or turn off the lamp source L.

Figure 9B:
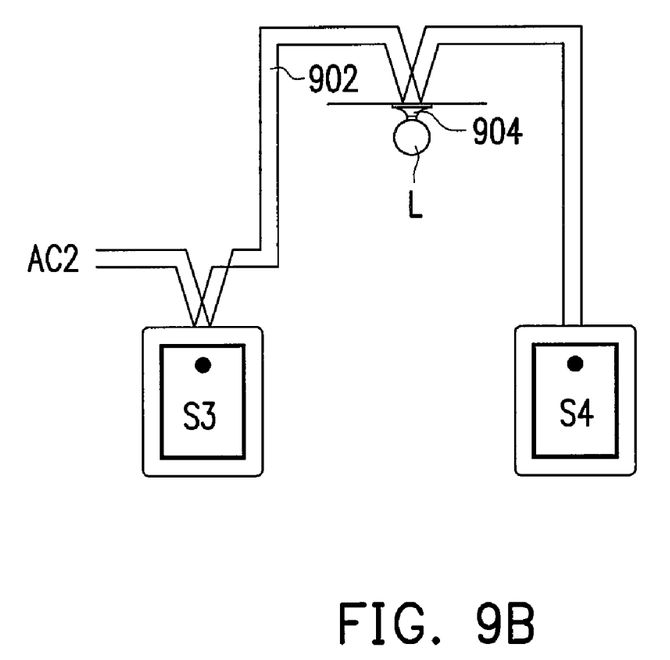
FIG. 9B is an actual wiring diagram of a lamp control apparatus according to another embodiment of the present invention.

FIG. 9B is an actual wiring diagram of a lamp control apparatus according to another embodiment of the present invention. As shown in FIG. 9B, the user can connect a new switch S4 to the power line 902 in series when another set of switches for controlling the lamp socket 904 is required to be added.

Due to that the power line is used to control the electric equipment, the wiring of the present invention is simple. In addition, the present invention has flexibility in use, and the number of the input units can be added at any time. The present invention further has a plurality of control modes including one-to-one control, many-to-one control, or many-to-many control.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An apparatus for controlling a lamp source, comprising:
    an input unit, generating a digital control signal according to an operation of a user;
    a lamp socket, for connecting a lamp source; and
    a power line, receiving a power source, and connecting the input unit and the lamp socket;
    wherein the lamp socket receives the digital control signal through the power line and determines whether or not to provide the power source to the lamp source according to the digital control signal, and the lamp socket comprises:

a connector module, for connecting the lamp source;

a first switch, for connecting the connector module to the power line;

a first transmission interface, capturing the digital control signal from the power line; and a first processor, coupled to the first transmission interface, for controlling the turn on/off of the first switch according to the digital control signal.

2. An apparatus for controlling a lamp source as claimed in claim 1, wherein the input unit comprises:

a second switch;

a second processor, generating the digital control signal according to a state of the second switch; and a second transmission interface, coupled to the second processor, for carrying the digital control signal on the power line, so as to control the lamp socket through the power line.

3. An apparatus for controlling a lamp source as claimed in claim 1, wherein the power source is an AC power source.

4. An apparatus for controlling an electric equipment, comprising:

an input unit, generating a digital control signal according to an operation of a user;

a power socket, for connecting the electric equipment; and a power line, receiving a power source, and connecting the input unit and the power socket;

wherein the power socket receives the digital control signal through the power line, and determines whether or not to provide the power source to the electric equipment according to the digital control signal, and the power socket comprises:

a connector module, for connecting the electric equipment;

a first switch, for connecting the connector module to the power line;

a first transmission interface, receiving the digital control signal through the power line; and a first processor, coupled to the first transmission interface, for controlling the turn on/off of the first switch according to the digital control signal.

5. An apparatus for controlling an electric equipment as claimed in claim 4, wherein the input unit comprises:

a second switch;

a second processor, generating the digital control signal according to a state of the second switch; and a second transmission interface, coupled to the second processor, for carrying the digital control signal on the power line, so as to control the power socket though the power line.

6. An apparatus for controlling an electric equipment as claimed in claim 4, wherein the power source is an AC power source.

* * * * *